United States Patent [19]

Shida et al.

[11] 4,382,691

[45] * May 10, 1983

[54] ELECTRONIC WATCH

[75] Inventors: Masaharu Shida; Akira Torisawa; Jun Ueda; Masaaki Mandai; Katsuhiko Sato, all of Tokyo, Japan

[73] Assignee: Kabushiki Kaisha Daini Seikosha, Japan

[ * ] Notice: The portion of the term of this patent subsequent to Jan. 19, 1999, has been disclaimed.

[21] Appl. No.: 169,312

[22] Filed: Jul. 16, 1980

Related U.S. Application Data

[63] Continuation of Ser. No. 886,542, Mar. 14, 1978, abandoned.

[30] Foreign Application Priority Data

Mar. 16, 1977 [JP] Japan .................................. 52-28977

[51] Int. Cl.$^3$ .......................... G06F 1/04; G04C 3/00

[52] U.S. Cl. .................................... 368/157; 368/218; 318/696

[58] Field of Search ................. 368/28, 76, 80, 85-87, 368/155-157, 159, 160, 200-204, 217-219; 318/696

[56] References Cited

U.S. PATENT DOCUMENTS

| | | | |
|---|---|---|---|
| 3,812,670 | 5/1974 | Nikaido et al. | 368/159 |
| 3,855,781 | 12/1974 | Chihara et al. | 368/28 |
| 4,032,827 | 6/1977 | Dobratz et al. | 318/696 |
| 4,114,364 | 9/1978 | Takahashi | 368/219 |
| 4,212,156 | 7/1980 | Kawamura et al. | 368/85 |
| 4,312,059 | 1/1982 | Mandai et al. | 368/157 |

*Primary Examiner*—Vit W. Miska

*Attorney, Agent, or Firm*—Robert E. Burns; Emmanuel J. Lobato; Bruce L. Adams

[57] ABSTRACT

In an analog electronic watch having a calendar display the power required during change of the calendar display, about 6 hours out of 24, is greater than at other times. In order to effect economy in power consumption, the pulse for driving the watch motor during the time other than the period in which the calendar display is being changed is only sufficient to drive the time indicating means. In case the motor fails to step when such pulse is applied, this is detected by a detecting circuit and a corrective drive pulse is applied to the motor so as to drive it.

14 Claims, 14 Drawing Figures

ELECTRONIC WATCH

This is a continuation, of application Ser. No. 886,542, filed Mar. 14, 1978, abandoned.

FIELD OF INVENTION

The present invention relates to an improvement of an electronic watch in which power consumption of a stepping motor can be reduced. The present invention will be explained on the basis of an embodiment of the present invention as applied to an analog type electronic watch.

BACKGROUND OF THE INVENTION

In an analog type crystal watch having a calendar display, the output of a motor comprising a stator, a driving coil, and a rotor is transmitted to a fifth wheel, a fourth wheel, a third wheel and a second wheel and is then transmitted to a cylindrical member, a cylindrical wheel, a second hand, a minute hand, an hour hand and a calendar mechanism. In the case of a wristwatch, the load on the stepping motor is extremely small except for the time during which the calendar is switched so that a torque of about 1.0 g-cm in the second wheel is sufficient. However, when the calendar is being switched, a torque several times higher than this is required. The time required for switching the calendar within a 24 hour period is at most only about 6 hours. However, in the mechanism according to the prior art there is the problem that sufficient electric power for operating the calendar driving mechanism in a stable manner must always be supplied from the power supply. This results in a large drain on the battery.

In an electronic watch according to the prior art, the circuitry for driving the stepping motor comprises an oscillator circuit generating a signal of, for example, 32,768 Hz. A frequency divider circuit converts this to a one second signal which is converted by a pulse width combining circuit to a signal pulse having a pulse width of 7.8 msec and a period of 2 seconds. This is dephased and applied through inverters to the motor driving coil. As a result, an inverted pulse which changes direction once each second is applied to the coil so that the rotor, which is magnetized with two poles, rotates in one direction. In this manner the drive pulse width of the present day electronic watch is set by the required maximum torque as its standard. This has prevented obtaining a low power consumption.

SUMMARY OF THE INVENTION

In order to overcome these defects, in the electronic watch according to the present invention, a motor is driven by a pulse having a shorter pulse width and a lesser effective power than the conventional one and afterwards a detecting pulse is applied to a coil so as to determine rotation of the rotor, and the rotation of the rotor is detected by a voltage level across a resistor connected in series to the coil and, if the rotor fails to rotate, a correction is effected by driving the motor by a pulse with a greater pulse width and a greater effective power than that of the normal pulse. In this manner the power consumption during a major portion of the day is greatly reduced while at the same time sufficient power for driving the calendar mechanism is supplied during the limited period that the calendar is being switched.

BRIEF DESCRIPTION OF THE DRAWINGS

The nature, objects and advantages of the invention will be more fully understood from the following description in conjunction with the accompanying drawings in which.

DESCRIPTION OF PRIOR ART

Figure 1:
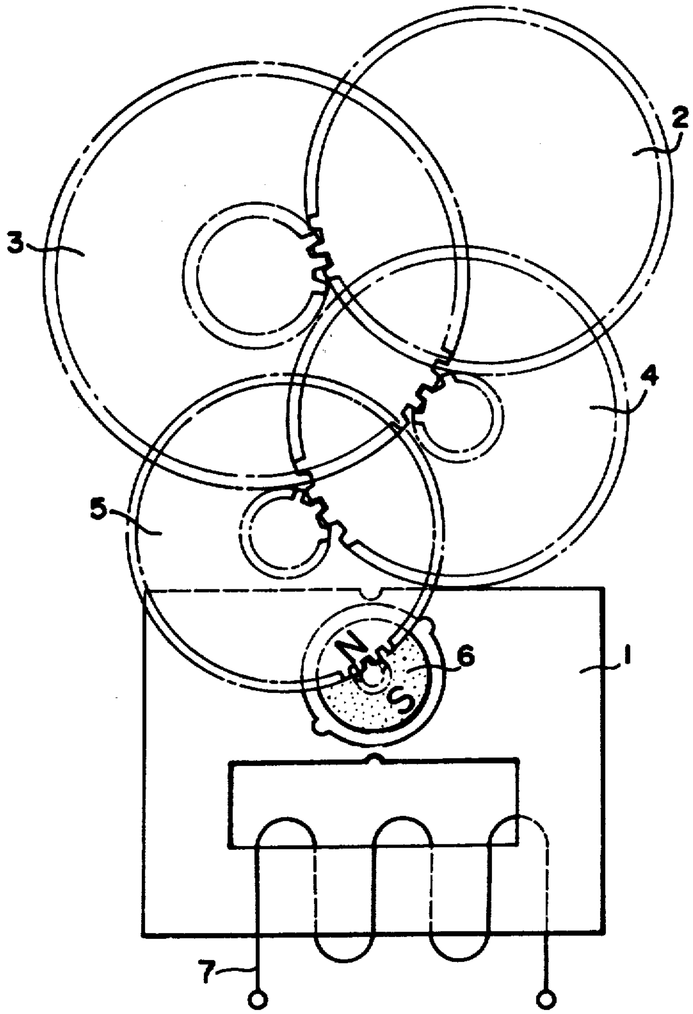
FIG. 1 shows schematically driving mechanism of an analog type crystal watch.

The display mechanism of an analog type crystal watch heretofore used is generally constructed as shown in FIG. 1. The output of a motor comprising a stator 1, a coil 7 and a rotor 6 is transmitted to a fifth wheel 5, a fourth wheel 4, a third wheel 3, and a second wheel 2. Although not shown, the output is then transmitted to a cylindrical member, a cylindrical wheel, a second hand, a minute hand, an hour hand and a calendar mechanism.

In the case of a wristwatch, the load on the stepping motor is extremely small except for the time for switching the calendar so that a torque of 1.0 g-cm in the second wheel is enough for driving the second, minute and hour hands. However, when switching the calendar, a torque several times higher than this is required. The time required for switching the calendar within twenty-four hours operation for the day, is only about six hours at most. However, for the reasons described above in the mechanism according to the prior art, there is a problem that the electric power which enables the calendar driving mechanism to be operated in a stable condition must be always supplied from the wristwatch power supply.

Figure 2:
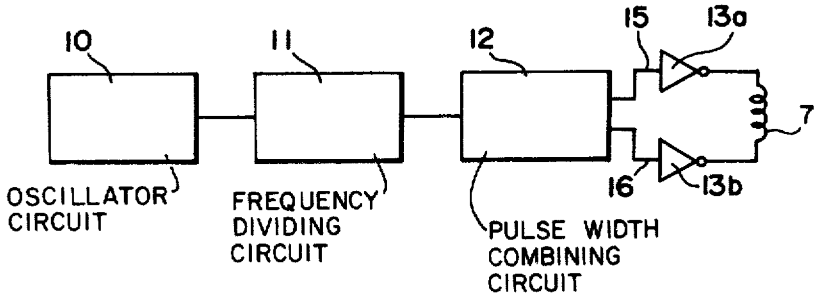
FIG. 2 shows the circuit construction of an electronic watch.
Figure 3:
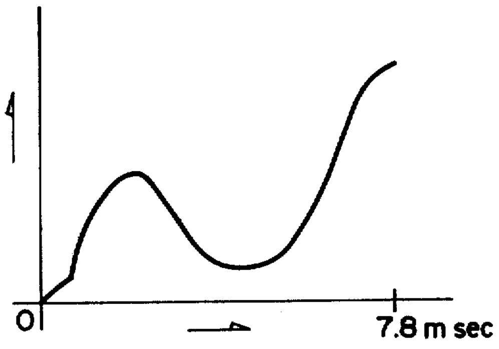
FIG. 3 shows the current wave form of a conventional stepping motor of an electronic watch.

FIG. 2 shows an electronic watch circuit construction. A higher than normal torgue is also needed to assure proper operation in the event the watch is placed in a magnetic field (e.g., placed near electric motors) or subjected to low temperature conditions which cause an increase of the internal resistance of the watch battery. For these reasons, it has not heretofore been possible to significantly reduce the overall power consumption of electronic timepieces since power must be supplied to obtain the large torque required during the other than normal timepiece operating periods even though less power is needed during normal timepiece operating periods when a lesser torque is required according to the prior art. The signal of 32,768 Hz from an oscillator circuit 10 is converted to a one second signal by a frequency dividing circuit 11. Thie one second signal is converted to a signal having a pulse width of 7.8 msec and a period of 2 seconds by a pulse width combining circuit 12. Thus signals having the same period and pulse width but dephased by one second are applied to the inputs 15 and 16 of inverters 13*a* and 13*b*. As a result, an inverted pulse which changes the direction of the current is applied to the motor coil 7 each second so that the rotor 6 which is magnetized with two poles, rotates in one direction. FIG. 3 shows the current waveform. In this manner, the drive pulse width of the present day electronic watch is set by the required maximum torque as its standard. Therefore, in the time interval which does not require a large torque, electric power is wasted. This has prevented attaining lower power consumption of the watch.

DESCRIPTION OF PREFERRED EMBODIMENTS

The principle of the rotation of a stepping motor for use in an electronic watch according to the present invention is as follows.

Figure 4:
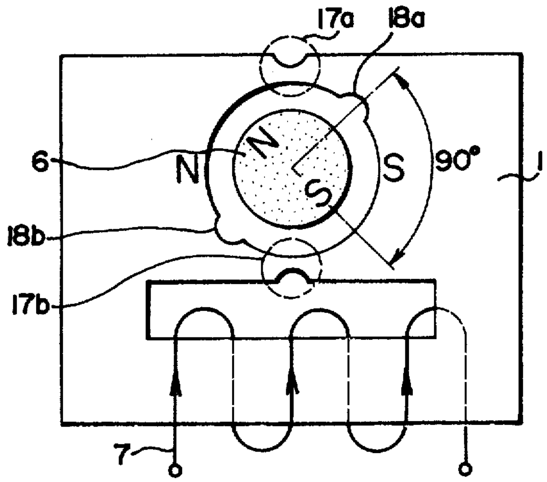
FIGS. 4, 5 and 6 illustrate the operation of the stepping motor.

Referring to FIG. 4, numeral 1 shows a stator constructed in one integral body having a magnetic path or circuit portion 17*a*,17*b* which is easily saturable. The stator is magnetically coupled with a magnetic core of the coil 7. In order to determined the direction of rotation of the rotor 6 having two magnetic poles provided in the direction of its diameter, notches 18*a* and 18*b* are provided in the stator. In FIG. 4 the condition is shown in which electric current has just been applied to the coil 7. When no current is applied to the coil 7, the rotor 6 remains stationary at the position shown in FIG. 4 with an angle of approximately 90 degrees between the notches 18*a* and 18*b* and the magnetic poles of the rotor. In this condition, when current applied to the coil 7 flows in the direction of the arrows, the magnetic poles N and S are produced in the stator 1 as shown in FIG. 4, so that the rotor 6 rotates in a clockwise direction by like poles repulsing each other. When the current flowing through the coil 7 is interrupted, the rotor 6 will position itself with its magnetic poles in the reversed condition to that shown in FIG. 4. Afterwards, the rotor 7 will be kept sequentially rotating in a clockwise direction by current flowing in the opposite direction. Since the stepping motor stator used in the electronic watch according to the present invention is constructed in one integral body having saturable portions 17*a* and 17*b*, the current waveform of the current flowing through the coil 7 presents a characteristic with a slow rising curve as shown in FIG. 3. The reason for this is that before the saturable portions 17*a*, 17*b* of the stator 1 become saturated, the magnetic resistance of the magnetic circuit seen from coil 7 is very small, so that the time constant $\tau$ of the series circuit of the resistor and the coil becomes very large. The equation of this condition can be expressed as follows:

$$\tau = L/R, \; L \simeq N^2/Rm \qquad (1)$$

Therefore, the following equation is established $$\tau = N^2/(R \times Rm) \qquad (2)$$

where L denotes the inductance of the coil 7; N, the number of turns of the coil 7; Rm, magnetic resistance.

When the saturable portions 17*a*,17*b* of the stator 1 are saturated, the permeability of these portions becomes the same as that of the air. Accordingly, the Rm increases and the time constant $\tau$ of the circuit becomes small, and the wave of the current rises abruptly as shown in FIG. 3.

According to the present invention, the detection of the rotation or non-rotation of the rotor 6 in the motor of an electronic wristwatch is effected by detecting the difference of the time constant of the circuit consisting of the resistor and coil connected in series. The reason for producing the difference of the time constants will now be explained.

Figure 5:
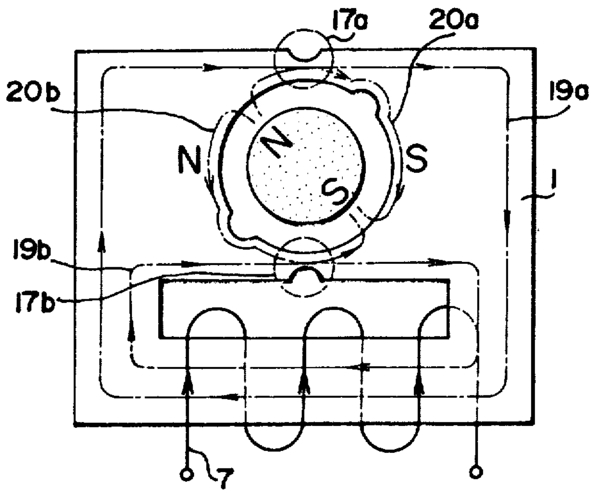
Figure 7:
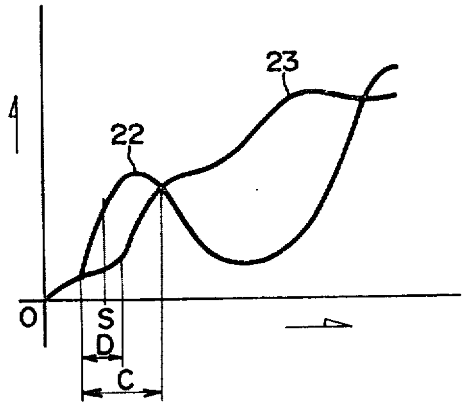
FIG. 7 shows the current wave form of the rotor of the stepping motor in non-operating condition.

FIG. 5 shows the magnetic field at the time of the current flowing through the coil 7. In FIG. 5, the rotor 6 is in the position in which it is rotatable against the magnetic poles. The magnetic fluxes 20*a* and 20*b* are those which are derived from the rotor 6. The magnetic flux which intersects the coil 7 also exists in practice; however this is neglected here. The magnetic fluxes 20*a* and 20*b* are shown as being derived from the saturable portions 17*a* and 17*b* of the stator 1 and they are directed as indicated by the arrows. The saturable portions 17*a*, 17*b* are, in the most cases, not in the saturated condition. In this condition, the current flows in the direction of the arrows on coil 7 so as to rotate the rotor 6 clockwise. The magnetic fluxes 19*a* and 19*b* produced by the coil 7 are added to the magnetic fluxes 20*a* and 20*b* produced by the rotor 6 within the saturable portions 17*a* and 17*b*, so that the portions 17*a*, 17*b* of the stator 1 rapidly saturate. Afterwards, a magnetic flux which is sufficient for rotating the rotor 6 is produced. However, this is omitted in FIG. 5. FIG. 7 shows the waveform 22 of the current flowing through the coil.

Figure 6:
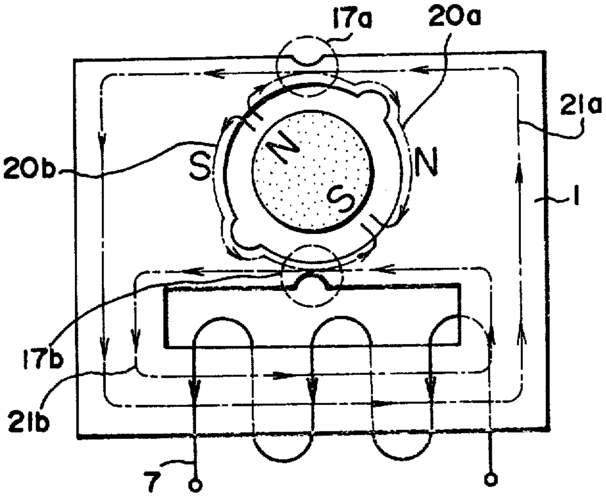

FIG. 6 shows the condition of the magnetic flux in which the current is flowing through the coil 7 at a time when the rotor 6 could not be rotated for some reason and returned to the original point. Generally, in order to rotate the rotor 6, the current must be flowing in the coil 7 in the direction opposite to the arrows, i.e. in the same direction as that as shown in FIG. 5. However, in this case since an alternating inverted current is applied to the coil 7 for every rotation, this condition occurs whenever the rotor 6 could not be rotated. Since the rotor 6 could not be rotated in this case, the direction of the magnetic flux produced from the rotor 6 is the same as that shown in FIG. 5. In this case, since the current is flowing in the opposite direction to that shown in FIG. 5, the direction of the magnetic fluxes become 21*a* and 21*b*. In the saturable portions 17*a* and 17*b*, the magnetic fluxes produced respectively from the rotor 6 and the coil 7 canel each other, so that in order to saturate the saturable portions of the stator 1, a longer time is required. FIG. 7 shows this condition as the waveform 23. In this embodiment, the time interval D before the portions 17*a*, 17*b* of the stator 1 become saturated in FIG. 7 was 1 msec on the condition that the dimeter of the coil is 23 microns, number of turns 10,000, the coil series resistance 3 KΩ, the diameter of the rotor 1.3 mm and the minimum width of the saturable portion 0.1 mm. As it is apparent from the waveforms 22 and 23 of the two currents in FIG. 7, the inductance of the coil is small when the rotor 6 is rotating within the range of C in FIG. 7 while it is large at the time of non-rotation. In the stepping motor as described above, the equivalent inductance in the range of D was chosen as L=5 with the current waveform 22 when rotating, and was chosen as L=40 henry with the waveform 23 during nonrotation. For instance, when a resistor r as a passive element for effecting the detection and the coil series resistor R are connected in series to the inductance through a power supply $V_D$, the change in inductance is easily detected by the voltage appearing across the resistor element r for the detection in detecting the threshold value Vth of the MOS inverter, i.e. ½ Vn voltage. From the fact that the voltage produced across the resistor r is ½ Vn, the following equation is obtainable.

$$(\tfrac{1}{2})\cdot V_D = r/(R+r)\cdot[1-\mathrm{Exp}\{-(R+r)\cdot t/L\}] \qquad (3)$$

In this equation, when R=5 KΩ, t=1 msec, L=4 henry, r becomes 29. Moreover, in the case of the current waveform 22 in FIG. 7, the saturation time is approximately 0.4 m sec. Therefore, calculating the equation as R=3 KΩ, T=0.4 msec, L=5 henry, the resistance of the resistor r is r=7.1 KΩ. This means that the detectable range of the detecting resistor element falls between 7.1 KΩ to 29 KΩ. This result coincides with the result of the experiment. In the embodiment according to the present invention, the resistor element is used as a detecting element. However, it is also possible for the detecting element to be a passive element such as a coil or a capacitor or an active element such as an MOS transistor. As is apparent from the above description, rotation or non-rotation of the rotor 6 is to be determined by applying a detection signal sc that it is possible to drive the rotor with a low torque by applying a pulse with a short width as well as convert the driving to a high torque by a pulse with a long width when nonrotation of the motor is detected.

Figure 8:
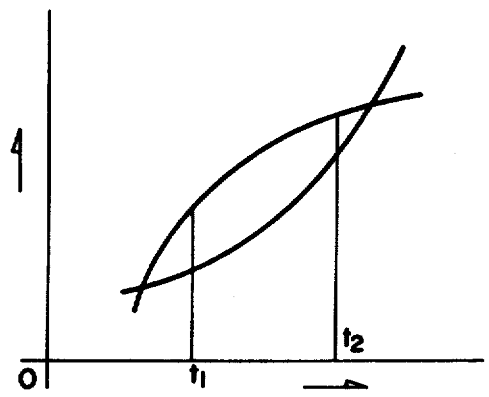
FIG. 8 shows the relationship between current consumption, output torque and drive pulse width of the stepping motor.

The determination of both pulses with a short width (corresponding to a given effective power) and a long width (corresponding to a greater effective power can be determined from the pulse width and current torque curve shown in FIG. 8. The pulse with a short width $t_1$ is set by the minimum torque necessary for normal pendulum movement and the specification of the motor is determined so as to obtain a maximum efficiency with this pulse width as well as to reduce the current consumption as much as possible. The pulse with a long width $t_2$ for the corrective driving has a width $t_2$ which makes it possible to obtain the maximum torgue for a wristwatch. From the foregoing it is possible to obtain an electronic wristwatch with very low power consumption compared with conventional wristwatches by setting the values of $t_1$ (normal case) and $t_2$ (worst case) as described above.

Furthermore, the feature of the detecting portion of the electronic watch according to the present invention resides in enabling the detection of inductance change without using another specific amplifier componet. In FIG. 7, there is shown a very simple method for realizing the detection in which a D.C. resistor the value of which is nearly the same as that of the coil 7 or larger than that is temporarily inserted in series with the coil 7 so as to apply a voltage across the resistor which is decided by the voltage dividing ratio of the impedance of the coil 7 and the resistor.

Figure 9:
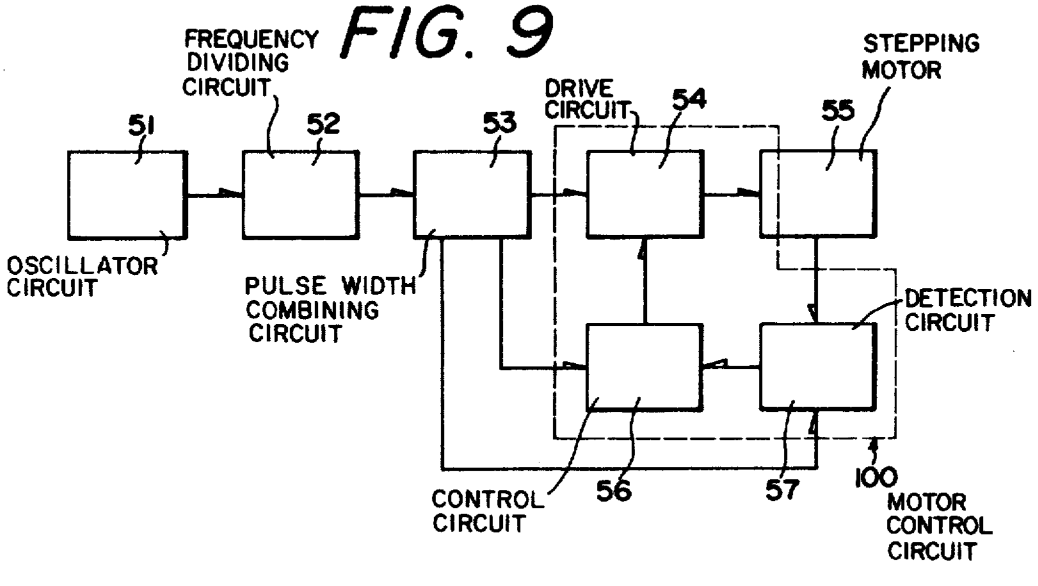
FIG. 9 is an overall block diagram of one embodiment of an electronic watch in accordance with the present invention.

FIG. 9 shows the block diagram of an overall electronic watch. A crystal oscillating circuit 51 oscillates to provide a signal which is used as a standard signal of the watch. A frequency dividing circuit 52 is constructed by multi-stage flip-flops which can divide the standard signal to obtain a one second signal for the oscillating signal required for the watch. A pulse width combining circuit 53 combines from each flip-flop output of the frequency dividing circuit, a normal drive pulse signal with the pulse width necessary for the driving, a drive pulse signal for the correcting drive, a detection pulse signal with a duration necessary for the detection, a time interval setting signal between the normal drive pulse and the detecting pulse and the detecting pulse, and the correcting drive pulse.

A drive circuit 54 supplies the normal drive pulse, the detecting pulse, and the correcting drive pulse, as an inverted pulse to the stepping motor.

The rotor of the stepping motor 55 is rotated by the application of the normal drive pulse when the load is low. However, the rotor is not rotated when the load is high, so that it is possible to detect either the rotating condition or the non-rotating condition of the rotor from the difference of the coil inductance depending on the above condition by applying the detecting signal to the detecting circuit 57. Accordingly, when the load of the motor increases for some reason and the rotor is not rotated at the time of applying the normal drive pulse, either the rotating or non-rotating condition of the rotor is detected by applying the detecting pulse immediately after the drive pulse has been applied. In this case, when the rotor is not rotated, the correcting drive pulse with a broader pulse width and greater effective power is applied to the rotor from the control circuit 56 for the corrective driving. In the embodiment of the electronic watch according to the present invention, the direction of the detecting pulse is set in the same direction as that of the drive pulse, but it is also possible to reverse the direction of the drive pulse.

Figure 10:
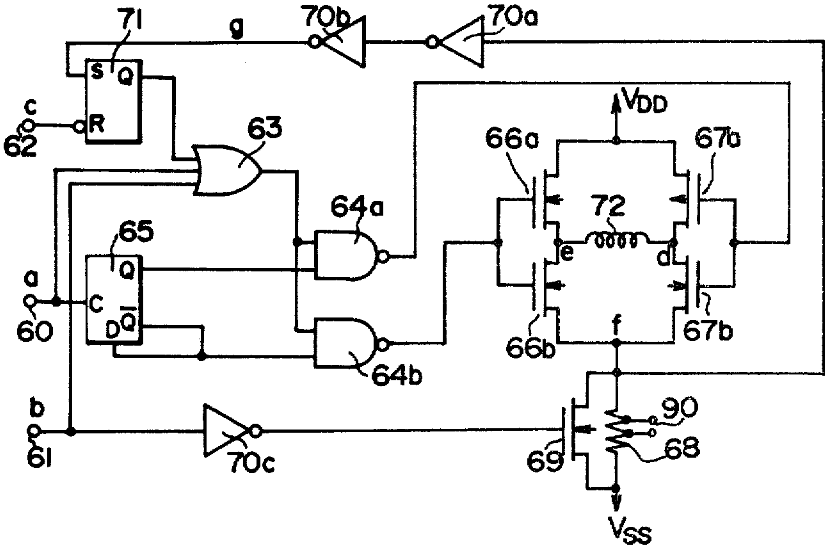
FIG. 10 is a circuit diagram of one embodiment of the drive circuit, control circuit and detection circuit of the block diagram shown in FIG. 9.

In the present embodiment, the pulse width combining circuit 53 can be easily constructed by the direct use of pulses, such as 1 msec, 3.9 msec, 7.8 msec, 31.2 msec, etc. pulses, which are obtainable from the crystal oscillating circuit 51 oscillating at 32.768 Hz and by dividing the same by the frequency dividing circuit 52. A detailed circuit thereof is therefore omitted. FIG. 10 shows in schematic form an embodiment of the motor control circuit 100 comprising the drive circuit 54, the circuit portion of the stepping motor 55, control circuit 56, and detection circuit 51. The drive circuit 54 consists of NAND gate 64*a* and 64*b*, a flip-flop 65, and driving inverters 66*a*, 66*b*, 67*b*. The motor 55 is provided with the driving coil 72. The detecting circuit 57 comprises inverters 70*a*, 70*b* and 70*c*, a transistor 69 as a switching element and a resistor element 68. The control circuit 56 is constructed by a flip-flop 71 and an OR gate 63.

Figure 11:
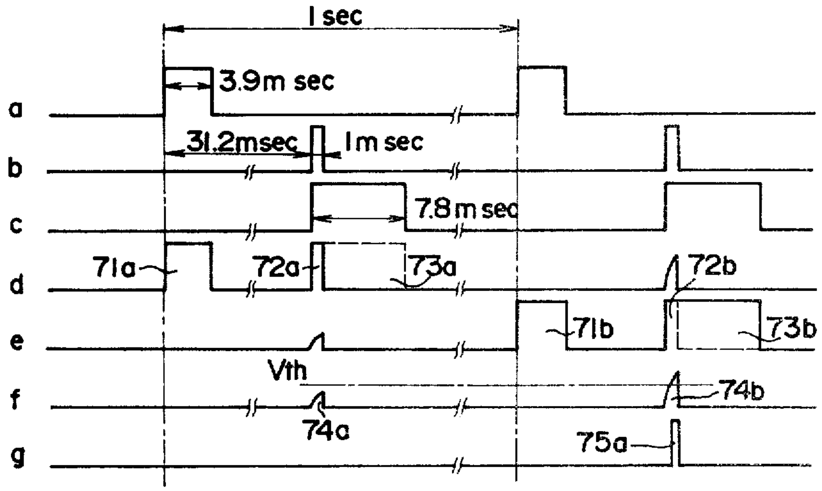
FIG. 11 is a time chart of the circuit shown in FIG. 10.
Figure 12:
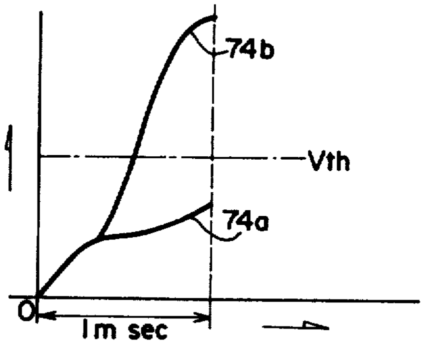
FIG. 12 shows a voltage wave form of a detecting terminal.

FIG. 11 shows a timing chart of each portion of FIG. 10. To terminals 60, 61 and 62 are timely applied the normal drive pulse, the detecting pulse and the correcting drive pulse as shown by waveforms a, b and c respectively in FIG. 11. As shown in FIG. 11, the correcting drive pulses represented by waveform c have a greater pulse width and a correspondingly greater effective power than the normal drive pulses represented by waveform a. These signals are combined by OR gate 63 and the phases thereof are selected by flip-flop 65 and NAND gates 64*a* and 64*b*. These signals are applied to the terminal of the motor coil 72 through the drive inverters 66*a*, 66*b* and 67*b* as shown in FIG. 10. Assuming now that the rotor is rotated normally one step by the drive pulse 71*a*, then the magnetic poles have a relationship as shown in FIG. 6 at the time of applying the detecting pulse 72*a* during the detecting period. Accordingly, the waveform of the coil current at this time presents a waveform similar to waveform 23 shown in FIG. 7 as described above, with a slow rising curve. At this time, the transistor 69 is off and the resistor 68 is connected in series with the coil 72, so that the current waveform clearly differs from that of FIG. 7. However, the rising portions of the waveforms resemble each other. A voltage waveform proportional to the current mentioned above appears across the terminal of the resistor 68, but it does not rise within the pulse width of the detecting pulse up to the threshold Vth of the inverter 70*a* as illustrated by the curve 74*a* in FIG. 12. Accordingly, the input signal of the set terminal S of the flip-flop 71 remains unchanged. As a result, a non-correcting pulse 73*a* is produced. However, when the rotor could not be rotated by one step by the drive pulse 71*b* for some reason, the magnetic poles have a relationship as shown in FIG. 5 at the time of applying the detecting pulse 72*b*, so that the current waveform has now the similar waveform as that of 22 in FIG. 7 which has a sharp rising time. Accordingly, the terminal voltage across the resistor 68 inverts the output by reaching the threshold value of the inverter 70*a* as shown in FIG. 12 with numeral 74*b*. As a result, the detecting signal 75 is applied to the set input of the flip-flop 71 and at the same time, the output Q rises. With this signal, the correcting pulse 73*b* rises while the signal of the terminal 62 falls, thus enabling corrective driving until the flip-flop 71 is reset. In the case of correction, the transistor 69 is on ON condition, in the same way as in normal driving, so that there is no power consumption due to the resistor 68 with the resistor 68 being short-circuited.

In the embodiment according to the present invention both resistor 68 and transistor 69 are used as a passive element for detection and a switching element, respectively. However, it is also possible to use an MOS transistor as an active element for the detection. In this case, the resistor element 68 shown in FIG. 10 can be omitted by selecting the ON resistance of the MOS transistor to be nearly zero, while the OFF resistance of the same is 15 KΩ.

Figure 13:
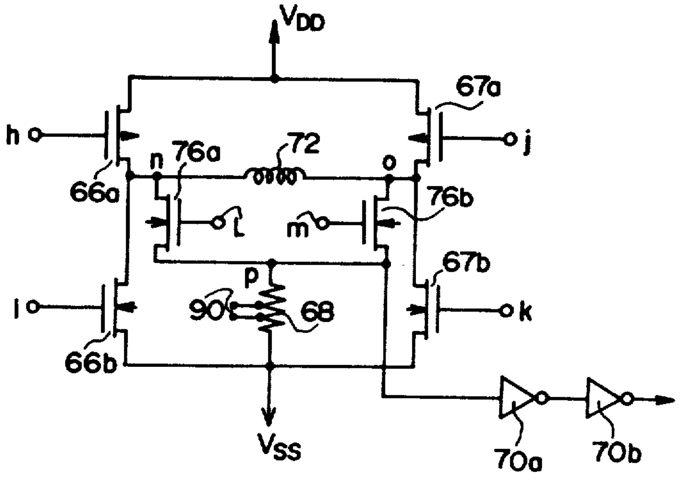
FIG. 13 shows another embodiment including the drive circuit and detecting circuit.
Figure 14:
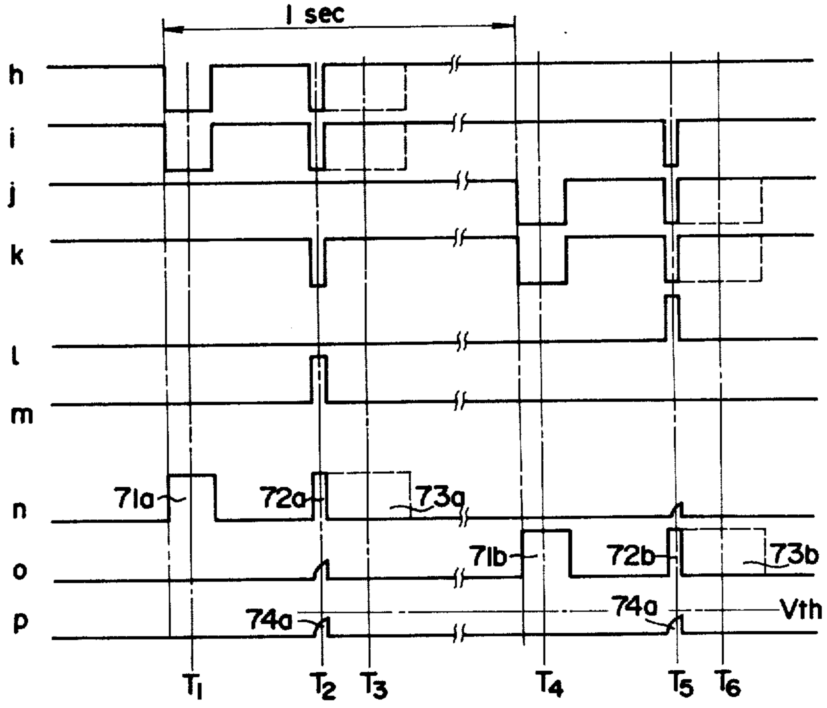
FIG. 14 shows the time chart of the circuits illustrated in FIG. 13.

FIGS. 13 and 14 show another embodiment of the detecting circuit, drive circuit and its timing chart, respectively. Although the detection principle is similar to that of the foregoing embodiment, in this embodiment, two pairs of transistors 66*a*, 66*b* and 67*a*, 67*b* comprising an inverter are separately controlled. Also, a resistor element is connected in parallel to the transistors 66*b*, 67*b* through transistors 76*a*, 76*b* and the selective ON and OFF operation of the transistors enables the prevention of power consumption due to the resistor 68 at the normal driving time and at the corrective driving time.

Referring now to FIG. 13 and FIG. 14, the embodiment according to the present invention is shown. The logic circuits for obtaining the timing pulses such as h, i, j, k as shown in FIG. 14 are not illustrated here because they are of standard type and known in the art.

At the normal driving time $T_1$ and the corrective driving time $T_2$, the transistors 66*a* and 67*b* are in ON condition, while other transistors are respectively OFF. Accordingly, the current flows from the transistor 66*a* to the coil 72 and the transistor 67*b*. Next, at the detecting pulse timing $T_2$, the transistors 66*a* and 67*b* are ON, so that the current flows from the coil 72 to the resistor 63 via the transistor 76*b* during the detecting period. By this current, it is possible for the circuit to detect the condition in a similar way as in the foregoing embodiment. Likewise, the same holds true at times $T_4$, $T_5$ and $T_6$ where the phase is inverted.

In the embodiment according to the present invention, since the rise of the detecting pulse and the corrective driving pulse occurs at the same time, the substantial corrective driving pulse width for driving the stepping motor becomes the maximum so that care should be taken as the rising time becomes shortened by the detecting pulse width.

As described in the foregoing, in the method according to the present invention, since the rotation or non-rotation of the rotor is discriminated from the current or the voltage characteristic thereof by applying the detecting pulse to the coil, it is possible to detect the rotor condition without changing the existing stepping motor. Therefore, the corrective drive can be carried out by a higher power corrective drive pulse than the normal load by the non-rotation signal when the most unfavorable condition to be expected in a watch is going to happen (i.e., worst case condition) with the output of the motor being set at the drive pulse width in which it does not cease in normal load condition.

By this method, the watch never stops operation even if the most unfavorable power consumption remains to such a degree that the power necessary for driving by the corrective drive pulse is added to the normal drive power. As compared with the conventional system, in this embodiment according to the present invention, the power consumption can be retained at about 60%, thus yielding a striking effect. Still, when the saturating time difference of the magnetic circuit of the stepping motor constructed as one body should be detected, all switching elements in the circuit are constructed by switching elements except for one resistor element. The value of this resistor ranges between 7.1 KΩ to 29 KΩ in the embodiment according to the present invention and the resistor elements can be integrated in the IC circuit. Therefore, additional parts for controlling the pulse width can be dispensed with thereby preventing the circuit from being more expensive. Furthermore, it is possible that the circuit can be utilized for the correction of the discrepancies between resistors due to the differences in IC fabrication processes as well as for different applications of IC circuits can be assembled in the integrated circuit when the active element is used as a detecting element. The purpose of the invention can be attained by the construction shown in FIG. 10. The simplification is also realized by the circuit construction described above. The circuit construction of FIG. 13 eliminates the necessity of a transistor with large capacity for the detection. Since all of the circuit can be constructed in the same degree in a chip size such as that of the conventional ones, thus preventing the increase of the manufacturing cost as well as eliminating the defect of the conventional circuits such as the increase of the chip size for permitting relatively a large drive current to flow through the transistor 69.

Moreover, since the threshold value Vth is always half of the power supply by the use of C-MOS logic element as a binary logic element for the detecting circuit, the detecting circuit is not subjected to the inclucence of the fluctuation in the power supply, this eliminating the above problems involving the C-MOS construction.

As described in the foregoing, it is apparent that a striking effect can be obtained when applying the present invention to electronic watches.

What is claimed is:

1. In an analog electronic timepiece of the type having a stepping motor comprised of a stator, a drive coil wound on the stator, and a rotor rotationally driven in response to pulses applied to the drive coil: an oscillator circuit for generating high frequency signals suitable as a time standard; a frequency dividing circuit receptive of the high frequency signals for frequency-dividing the same into lower frequency time signals; a pulse combining circuit receptive of the lower frequency time signals for combining the same to produce normal drive pulses and correcting drive pulses having a greater effective power than the normal drive pulses for applying the same to the motor drive coil for driving said stepping motor; detecting circuit means operative after each normal drive pulse is applied to the motor drive coil and at a time non-coincident with the application of each normal drive pulse for detecting a non-rotated condition of the motor rotor; and means controlled by said detecting circuit means for applying a correcting drive pulse to the motor drive coil before the next normal drive pulse is applied thereto in response to detection of a non-rotated condition of the motor rotor by said detecting circuit means.

2. An analog electronic timepiece according to claim 1, wherein said detecting circuit means includes means for detecting the non-rotated condition of the motor rotor by detecting the difference in inductance of the motor drive coil between rotated and non-rotated conditions of the motor rotor.

3. An analog electronic timepiece according to claim 2; wherein said detecting circuit means comprises a passive detecting element, a switching element and a binary logic element; means connecting said passive detecting element in series with the motor drive coil and in parallel with said switching element; and means connecting the input of said binary logic element to said passive detecting element.

4. An analog electronic timepiece according to claim 3; wherein said passive detecting element comprises a resistor.

5. An analog electronic timepiece according to claim 3; wherein said switching element comprises an MOSFET.

6. An analog electronic timepiece according to claim 1; wherein the detecting means comprises means operative only during detecting periods for detecting the non-rotated condition of the motor rotor, the detecting periods being non-coincident with and following the periods during which the normal drive pulses are applied to the motor drive coil.

7. An analog electronic timepiece according to claim 6; wherein the detecting means includes a passive detecting element; and means for electrically connecting the passive detecting element in series with the motor drive coil during the detecting periods.

8. In a battery-powered analog electronic timepiece of the type having a stepping motor comprised of a stator, a drive coil wound on the stator, and a rotor rotationally driven in stepwise manner in response to pulses applied to the drive coil: an oscillator circuit for generating high frequency signals suitable as a time standard; a frequency dividing circuit receptive of the high frequency signals for frequency-dividing the same into lower frequency time signals; a pulse combining circuit receptive of the lower frequency time signals for developing therefrom a succession of normal drive pulses having a given pulse period and a given effective power effective to develop the torque needed to rotationally drive the motor rotor when the normal drive pulses are applied to the motor drive coil under relatively low load timepiece operating conditions and a succession of correcting drive pulses separate from the normal drive pulses and having the same given pulse period though a greater effective power than the normal drive pulses and effective to develop the higher torque needed to rotationally drive the motor rotor when the correcting drive pulses are applied to the motor drive coil under higher load timepiece operating conditions in which the normal drive pulses are ineffective to rotationally drive the motor rotor; and motor control circuit means coacting with said pulse combining circuit for applying drive pulses to the motor drive coil in such manner to reduce overall battery power consumption by applying successive normal drive pulses to the motor drive coil whenever the immediately preceding normal drive pulse effected stepwise advancement of the motor rotor and otherwise applying, within the same pulse period as the normal drive pulse which failed to effect stepwise advancement, a correcting drive pulse to the motor drive coil before applying thereto another normal drive pulse to effect stepwise advancement of the motor rotor thereby conserving battery power by using the normal drive pulses of lesser effective power whenever possible to drive the motor rotor and using the correcting drive pulses of greater effective power only when the normal drive pulses are ineffective to drive the motor rotor.

9. A battery-powered analog electronic timepiece according to claim 18; wherein said motor control circuit means includes detecting circuit means for detecting, after application of each normal drive pulse to the motor drive coil, whenever a normal drive pulse fails to effect stepwise advancement of the motor rotor, and means responsive to such detection for applying a correcting drive pulse to the motor drive coil before the next normal drive pulse is applied thereto.

10. A battery-powered analog electronic timepiece according to claim 8 or 9; wherein said detecting circuit means includes means for detecting failure of the motor rotor to undergo stepwise advancement by detecting the difference in inductance of the motor drive coil between advanced and non-advanced states of the motor rotor.

11. A battery-powered analog electronic timepiece according to claim 12; wherein said pulse combining circuit includes means for developing normal drive pulses and correcting drive pulses of constant pulse width under all timepiece operating conditions.

12. A battery-powered analog electronic timepiece according to claim 8; wherein the detecting circuit means comprises means operative only during detecting periods for detecting the non-rotated condition of the motor rotor, the detecting periods being non-coincident with and following the periods during which the normal drive pulses are applied to the motor drive coil.

13. A battery-powered analog electronic timepiece according to claim 12; wherein the detecting circuit means includes a passive detecting element; and means for electrically connecting the passive detecting element in series with the motor drive coil during the detecting periods.

14. An analog electronic timepiece according to claim 1, 2, 8 or 9; wherein said pulse combining circuit includes means for developing normal drive pulses having a given pulse width and correcting drive pulses having a longer pulse width than the normal drive pulses.

* * * * *